United States Patent
Motley et al.

[11] Patent Number: 4,731,800
[45] Date of Patent: Mar. 15, 1988

[54] RAISED-COSINE FILTERING FOR MODEMS

[75] Inventors: David M. Motley, Santa Ana; John F. Stockman, Costa Mesa, both of Calif.

[73] Assignee: Hycom Incorporated, Irvine, Calif.

[21] Appl. No.: 914,886

[22] Filed: Oct. 3, 1986

[51] Int. Cl.[4] ................. H04B 15/00; H04L 25/08
[52] U.S. Cl. .................................... 375/58; 375/101; 375/103; 375/60
[58] Field of Search ............... 375/58, 101, 103, 20, 375/99, 60, 34

[56] References Cited

U.S. PATENT DOCUMENTS

| | | | |
|---|---|---|---|
| 4,261,053 | 4/1981 | Dostis et al. | 375/60 |
| 4,507,794 | 3/1985 | Jones et al. | 375/58 |
| 4,660,216 | 4/1987 | Claasen et al. | 375/60 |

Primary Examiner—Benedict V. Safourek
Assistant Examiner—Andrew J. Telesz, Jr.
Attorney, Agent, or Firm—Weissenberger & Peterson

[57] ABSTRACT

Filter quality is substantially improved (or complexity substantially reduced) in a digital PSK modem requiring an overall filter characteristic of the percent raised cosine type by using, in both the transmitter and the receiver, a filter having the same percent raised cosine response but at a higher cutoff frequency which satisfies the formula $$f_f = f_o\left(\frac{(1.047) + \pi}{\pi}\right)$$

where $f_f$ is the cutoff frequency (6 db) of the new filter, $f_o$ is one-half the baud rate of the modem, and $\alpha$ is the percent raised cosine expressed in decimal form.

1 Claim, 5 Drawing Figures

RAISED-COSINE FILTERING FOR MODEMS

FIELD OF THE INVENTION

This invention relates to digital phase-shift-keyed (PSK) or quadrature amplifier modulated (QAM) modems, and more particularly to a filtering scheme for such modems which requires fewer filter taps for the same out-of-band suppression than conventional filter techniques.

BACKGROUND OF THE INVENTION

In order to eliminate or at least reduce intersymbol interference in ditigal modems, it is necessary, in accordance with normal design techniques, to filter the signal through a low-pass filter system with a raised-cosine (RC) characteristic having a cut-off frequency equal to one-half the baud rate. This filtering ideally causes all sample impulses other than that of the current sample to have a null at the sample time, thus leaving a clean, unambiguous current sample.

Normally, this RC filtering is implemented by using a $\sqrt{RC}$ filter (i.e. a filter with a characteristic which is the square root of a raised cosine) in the transmitter and a $\sqrt{RC}$ filter in the receiver. Inasmuch as the overall filter characteristic is the product of the two, RC filtering results.

For acceptable levels of filtering, (i.e. out-of-band energy suppression), a relatively large number of filter taps are sometimes required. Inasmuch as each tap requires a multiplying operation, considerable computing power is required in a high-quality conventional FIR filter. Even with an increasing trend towards the requirement of more stringent filtering, this can become a problem. Consequently, there is a need for a filtering scheme which reduces the number of taps needed for a given filtering quality level.

SUMMARY OF THE INVENTION

The present invention rests, at least in part, on the recognition that if $\sqrt{RC}$ filters in the transmitter and receiver are replaced with RC filters of a higher cutoff frequency (the cutoff frequency normally being associated with one-half the baud rate), considerably fewer taps are required to maintain a given out-of-band suppression characteristic without significantly affecting the overall system impulse response.

In accordance with the invention, the new frequency of the RC filter is optimal at $$f_f = f_o \left( \frac{(1.047\alpha) + \pi}{\pi} \right)$$

where
- $f_f$ is the 6 db cutoff frequency of the filter;
- $f_o$ is the 6 db cutoff frequency of the required overall RC characteristic of the system (i.e. one-half the baud rate); and
- $\alpha$ is the percentage (expressed in decimals) of raised cosine specified for the overall RC characteristic of the system by the applicable design standards.

It is thus the object of the invention to improve the filtering level and/or reduce the complexity of digital modems using an RC filtering scheme by substituting for the conventional $\sqrt{RC}$ filters, RC filters of a higher cutoff frequency.

DESCRIPTION OF THE PREFERRED EMBODIMENT

Design standards for some digital modems, such as some of those promulgated by the Consultative Committee on International Telegraphy and Telephony (CCITT), require the modem to have a low-pass filtering characteristic expressed as a percentage raised cosine (% RC) for minimizing intersymbol interference. As shown in FIG. 1a, this requirement is normally implemented by including matching square root raised cosine low-pass filters 11, 13 in the transmitter 15 and receiver 17 of the modem.

Figure 1B:
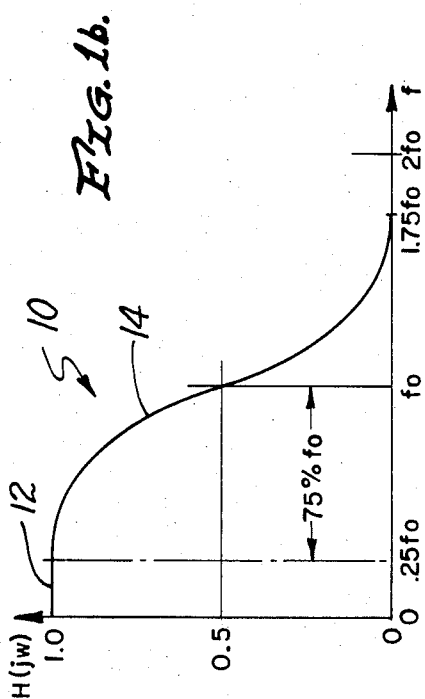
FIG. 1b is a graphical representation of the overall system filtering characteristic for intersymbol interference suppression required by a typical design standard for digital modems.
Figure 1A:
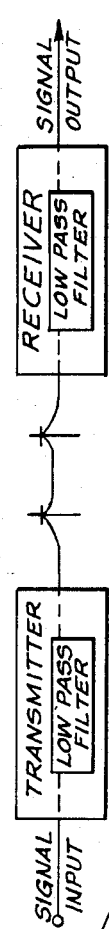
FIG. 1a is an overall block diagram of a digital modem.

FIG. 1b shows at 10 the 75% RC filtering characteristic of the CCITT V. 22 bis specification. The 75% figure means that the response curve of FIG. 1b has a flat portion 12 for the first 25% of the 6 db response frequency $f_o$ (300 Hz in the 600-baud system described herein), and then follows the first half 14 of a raised cosine curve for the remaining 75% of the fundamental frequency range. The raised cosine curve, of course, is simply a curve having the shape of $$y = \frac{(\cos x) + 1}{2}.$$

The curve 10 can be mathematically expressed as $$H(f) = \tau$$

for $0 \leq f \leq \frac{1}{2}\sigma(1-\alpha)$ $$H(f) = \frac{\tau}{2}\left[ 1 - \sin\left( \frac{\tau\pi}{2\alpha}\left(2f - \frac{1}{\tau}\right) \right) \right] \text{ for}$$

$$\frac{1}{2\tau}(1-\alpha) \leq f \leq \frac{1}{2\tau}(1+\alpha)$$

where
- f = frequency;
- H(f) = filter response as a function of frequency;

$$\tau = \frac{1}{\text{baud rate}};$$

and
- $\alpha$ = percentage of RC filter characteristic expressed in decimals.

In practice, the RC filtering is accomplished by providing a square root RC filter in the transmitter and another square root RC filter in the receiver. The product of the two produces the required RC filtering. Any channel distortion occurring between the transmitter and the receiver is typically compensated by a conventional equalizer.

Figure 2:
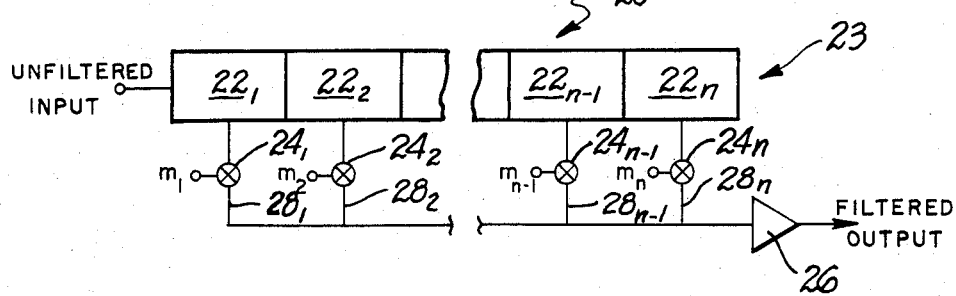
FIG. 2 is a block diagram of a typical digital filter.

FIG. 2 shows a typical digital filter 20 with baud sampling. The filter 20 consists of a series of storage registers $22_1$ through $22_n$ forming a delay line 23, a series of multipliers $24_1$ through $24_n$, and an accumulator 26. During each sampling interval (the sampling rate being a multiple of the baud rate of the system, twelve times in this example), a sample is applied to the input of the delay line formed by the registers 22 and the delay line is advanced by one step. After twelve samples (i.e. one baud), the contents of the registers 22 are multiplied by the respective multiplicands $m_1$ through $m_n$, and the results appearing at the taps $28_1$ through $28_n$ are accumulated in the accumulator 26 to form the filtered sample.

The response curve or filter characteristics of the filter 20 is determined by the values of the multiplicands $m_1$ through $m_n$, which in turn can be computed by known mathematical formulae, given the baud rate or the frequency response of the system and the desired theoretical response curve. As a practical matter, however, a filter does not quite follow the theoretical response curve because to do so would require an infinite number of taps. The truncation resulting from the finite number of taps which must be used in reality determines the amount of undesirable out-of-band energy passed by the filter.

The magnitude of this out-of-band energy (see FIG. 4) determines the quality of the filter. For any given theoretical response curve, the out-of-band energy is a function of the number of taps 28: the lower the number of taps, the greater the out-of-band energy.

Figure 3:
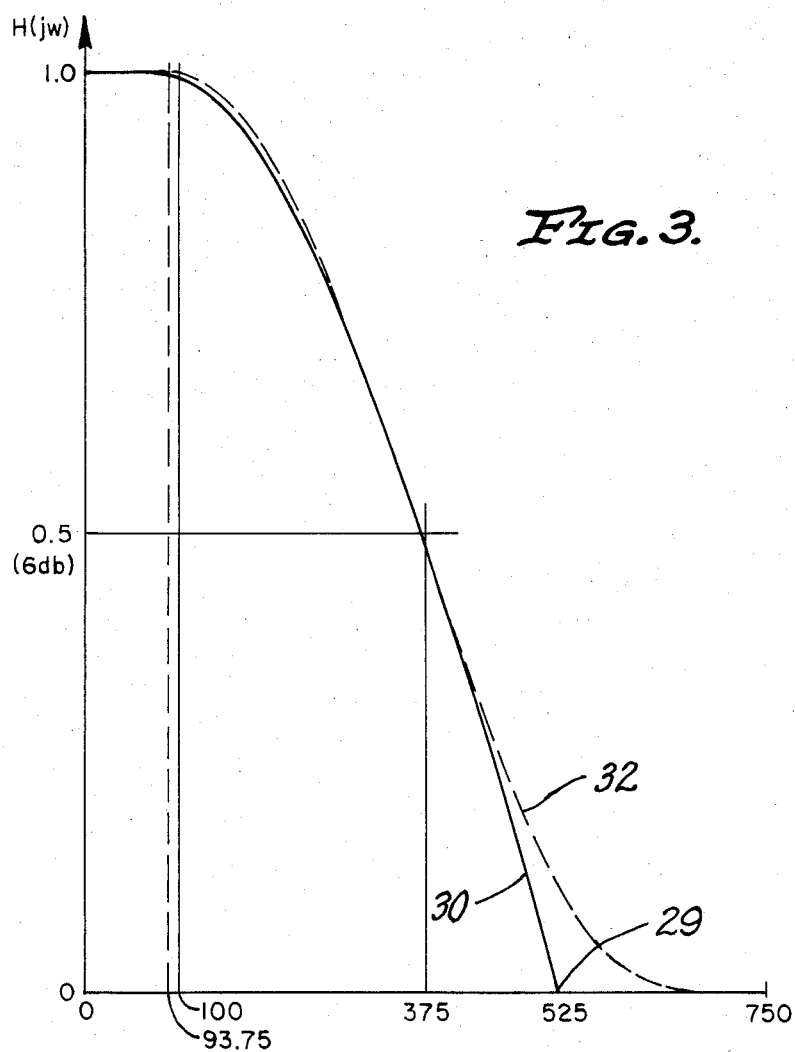
FIG. 3 is a graphical representation showing the theoretical frequency response of an RC filter with an infinite number of taps according to the invention as compared to a conventional RC filter with an infinite number of taps.

One disadvantage of the $\sqrt{RC}$ filter conventionally used in digital modems is that the theoretical response curve has a discontinuity at the zero-response point 29 (see FIG. 3). This discontinuity increases the out-of-band energy for a given number of taps, and therefore requires more taps to maintain a given filter quality.

It has now been found that this discontinuity can be avoided, and the number of filter taps required for a given filtering level considerably reduced, by substituting, for the conventional $\sqrt{RC}$ filter, RC filters designed to operate at a high frequency than the normal frequency system. As shown in FIG. 3, the theoretical response curve 30 of a 300 Hz (600-baud) 75% $\sqrt{RC}$ filter can be tracked almost perfectly through a frequency range in excess of 400 Hz by the theoretical response curve 32 of a 375 Hz (750-baud) 75% RC filter. The match is exact at the 6 db cutoff point (375 Hz).

In accordance with the invention, the best-fit curve is an RC curve with a baud rate of $$f_f = f_o \left\{ \frac{(1.047\alpha) + \pi}{\pi} \right\}$$

where
$f_f$ = new 6 db cutoff frequency of new filter;
$f_o$ = 3 db cutoff frequency of normal $\sqrt{RC}$ filter (i.e. one half the system baud rate);

$\alpha$ = filter percentage expressed in decimal.
For $\alpha = 0.75$, $f_f = 1.25\ f_o$ or 375 Hz in the example described.

In FIG. 3, the largest discrepancies lies in a frequency range where the difference in the filter's impulse response is only about 1% as compared to the $\sqrt{RC}$ filter. This difference is much less than that caused by normal channel distortion, and it is amply taken care of by the equalizer conventionally used in modems of this type.

Figure 4:
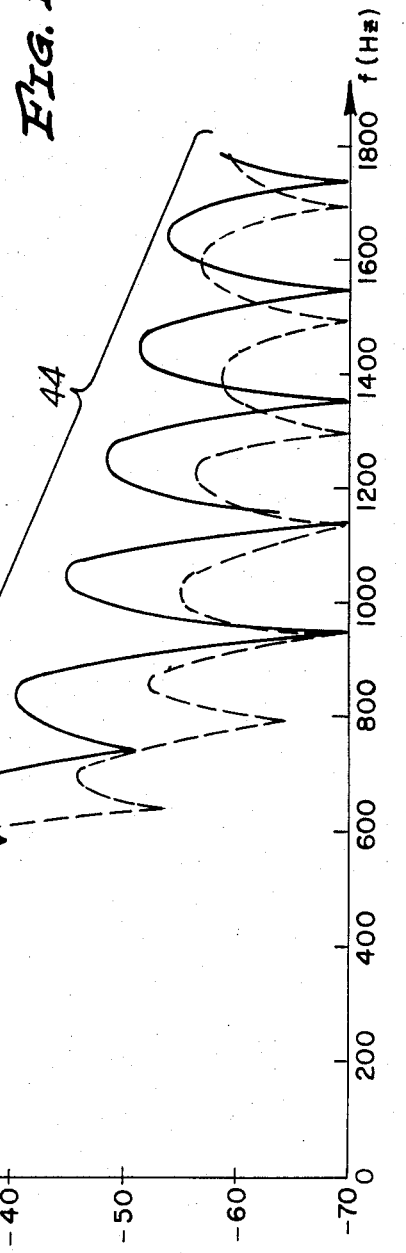
FIG. 4 is a graphical representation of the actual frequency response of a 36-tap 75% RC filter generated according to the invention, as compared to a conventional 36-tap 75% $\sqrt{RC}$ filter.

FIG. 4 is a comparison of the inverse Fourier transforms of an actual 36-tap, 600-baud 75% $\sqrt{RC}$ filter as used in the prior art (curve 40) and a 36-tap, 750-baud 75% RC filter as used in this invention (curve 42). It will be noted that the peaks of the undesirable out-of-band frequency components 44 are from thirteen to five db down in curve 42 as compared to curve 40. It follows that to maintain the same filtering level, fewer taps 28 are required in the scheme of this invention than in the conventional scheme.

It will be understood that neither the sample rate nor the actual baud rate of the system are affected by the invention; the invention is carried out by merely changing the multiplicands $m_1$ through $m_n$ of the filter 20 to the values required for an RC filter at the elevated frequency.

We claim:

1. A digital modem including low-pass intersymbol interference suppression filter means required to have an overall response characteristic of the form $$H(f) = \tau$$

for $0 \leq f \leq \frac{1}{2}\tau(1-\alpha)$, and $$H(f) = \frac{\tau}{2}\left[ 1 - \sin\left\{ \frac{\tau\pi}{2\alpha}\left( 2f - \frac{1}{\tau} \right) \right\} \right]$$

for $$\frac{1}{2\tau}(1-\alpha) \leq f \leq \frac{1}{2\tau}(1+\alpha),$$

where
$H(f)$ = filter response as a function of frequency $$\tau = \frac{1}{\text{baud rate}};$$

and
$\alpha$ = percentage of RC filter characteristic expressed in decimals the improvement comprising using, in both the transmitter and the receiver of said modem, separate low-pass filter means having a response characteristic of the form $$H(f) = \tau$$

for $0 \leq f \leq \frac{1}{2}\tau(1-\alpha)$, and $$H(f) = \frac{\tau}{2}\left[ 1 - \text{SIN}\left\{ \frac{\tau\pi}{2\alpha}\left( 2f - \frac{1}{\tau} \right) \right\} \right]$$

for $$\frac{1}{2\tau}(1-\alpha) \leq f \leq \frac{1}{2\tau}(1+\alpha),$$

at a cutoff frequency which is related to the cutoff frequency of said overall response characteristic by substantially the formula $$f_f = f_o\left(\frac{(1.047\alpha) + \pi}{\pi}\right)$$

where
 $f_f$=6 db cutoff frequency of said separate low-pass filter means, and
 $f_o$=6 db cutoff frequency of said overall response characteristic.

* * * * *

UNITED STATES PATENT OFFICE
CERTIFICATE OF CORRECTION

Patent No. 4,731,800  Dated Mar. 15, 1988

Inventor(s) David M. Motley et al

It is certified that error appears in the above-identified patent and that said Letters Patent are hereby corrected as shown below:

Column 2, line 50 change "$\frac{1}{2\sigma}$" to -- $2\frac{1}{\tau}$ --.

Column 3, line 67 change "$\sqrt{}$ RC" to -- $\sqrt{RC}$ -- .

Column 4, line 4 change "lies" to -- lie --.

Signed and Sealed this

Nineteenth Day of July, 1988

Attest:

DONALD J. QUIGG

Attesting Officer  Commissioner of Patents and Trademarks